United States Patent [19]

Kasai et al.

[11] Patent Number: 4,635,214
[45] Date of Patent: Jan. 6, 1987

[54] FAILURE DIAGNOSTIC PROCESSING SYSTEM

[75] Inventors: Hitoshi Kasai; Yasuyoshi Asagi, both of Kawasaki; Toshihiro Hattori, Ayase; Hideo Saito, Hiratsuka; Katsuya Shishido, Fujisawa, all of Japan

[73] Assignee: Fujitsu Limited, Kawasaki, Japan

[21] Appl. No.: 626,234

[22] Filed: Jun. 29, 1984

[30] Foreign Application Priority Data

Jun. 30, 1983 [JP] Japan ................. 58-119164

[51] Int. Cl.$^4$ ............................................. G06F 15/36
[52] U.S. Cl. .................... 364/551; 364/507; 371/5
[58] Field of Search ............ 364/424.1, 507, 551, 364/552; 377/15, 16, 19; 371/5

[56] References Cited

U.S. PATENT DOCUMENTS

| | | |
|---|---|---|
| 2,768,784 | 10/1956 | Gordon et al. ................. 364/507 |
| 3,534,403 | 10/1970 | Matarese ........................ 371/5 |
| 3,584,203 | 6/1971 | Patzelt et al. .................. 364/507 |
| 4,215,404 | 7/1980 | Bukhtiyarov et al. ......... 364/551 |
| 4,393,732 | 7/1983 | Suzuki et al. ................... 74/867 |
| 4,402,054 | 8/1983 | Osborne et al. ............... 364/551 |
| 4,566,101 | 1/1986 | Skonieczny et al. .......... 371/5 |

FOREIGN PATENT DOCUMENTS

| | | |
|---|---|---|
| 2723714 | 12/1977 | Fed. Rep. of Germany . |
| 2927051 | 1/1981 | Fed. Rep. of Germany . |
| 2265568 | 10/1975 | France . |
| 0013511 | 1/1982 | Japan ................. 364/552 |

OTHER PUBLICATIONS

European Search Report, Vienna, 10/5/84.

Primary Examiner—Parshotam S. Lall
Attorney, Agent, or Firm—Staas & Halsey

[57] ABSTRACT

A failure diagnostic processing system including a checking element for achieving a diagnostic check with respect to sensors to produce first and second diagnostic signals regarding each sensor. The first and second diagnostic signals indicate whether or not a failure condition stands, respectively. Also included are counting element for achieving a count up and a count down selectively in response to the first and second diagnostic signals, respectively; an alarm element for providing an alarm indication in accordance with the count number of the counting element; and a recording element for creating a history of failure by recording the count number of the counting element where the count number exceeds a predetermined reference number for starting the record.

13 Claims, 7 Drawing Figures

FAILURE DIAGNOSTIC PROCESSING SYSTEM

BACKGROUND OF THE INVENTION

1. Field of the Invention

The present invention relates to a failure diagnostic processing system, more particularly to a system for performing a diagnostic search in a computer controlled apparatus, for example, an electronic controlled automatic transmission apparatus for use in automobiles.

2. Description of the Prior Art

Obviously, the present invention can be also applied to other similar apparatuses, such as computer controlled data processing or data communication systems, and the like. However, to facilitate a better understanding of the present invention, the following explanation will be made by using the electronic controlled automatic transmission apparatus as a preferred example.

Automobiles are equipped with an automatic transmission to eliminate a difficult clutch operation by automatically effecting the so-called gear changes, thus making the operation of the automobile easy even for an unskilled driver. Various apparatuses are known and used for this purpose and, recently, there is a trend toward realizing such an automatic transmission with the aid of a microcomputer, i.e., an electronic controlled automatic transmission, control is achieved through various information signals or data, such as engine speed, rotational input-shaft speed, gear position, clutch stroke, etc., and this necessitates the use of various sensors for detecting the above-mentioned information signals. Where such sensors are used, it is important to manage these through appropriate diagnostic searches, in order to maintain high reliability in the operation of the automobile.

In the prior art, the following diagnostic search method, for example, has been proposed. In this prior art method, particular memory bits are allotted, in advance, in a certain memory for each individual sensor. If a failure is detected in any one of the sensors, the corresponding memory bit allotted to that sensor is changed from, for example, "0" to "1", so that an alarm is raised indicating the occurrence of the failure with the logic "1" bit. However, the prior art method contains problems in that, first, undesired flashing of the failure indication often occurs due to a failure which is not continual but intermittent, and second, it is difficult to investigate failures which occurred in the past but are no longer present. That is, the prior art method is inherently not available for investigating a history of failures regarding each of the sensors mentioned above.

SUMMARY OF THE INVENTION

It is an object of the present invention to provide a failure diagnostic processing system which can suppress the aforesaid undesired flashing of the failure indication so that a highly reliable diagnostic search can be performed and, in addition, can provide a history of failures for each of the sensors mentioned above.

The above object is basically attained by an apparatus including means for achieving a diagnostic check with respect to each sensor, a counting means for counting signals from the checking means upward or downward in accordance with a resultant determination given by the checking means, an alarm means for indicating an alarm in accordance with the counted number of these signals, and a recording means for recording a history of failures, the failures to be recorded selectively when judged to be important in view of the number counted by the counting means.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Before describing the preferred embodiments of the present invention, an explanation will be given of a know automatic transmission apparatus, as an example, to which the present invention can be advantageously applied.

Figure 1:
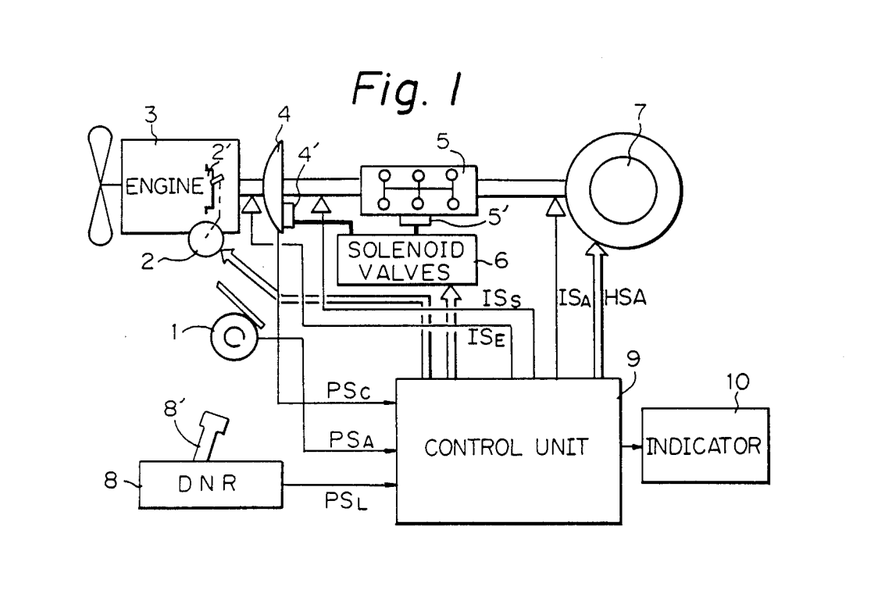
FIG. 1 is a block diagram of a known electronic controlled automatic transmission apparatus provided in a body of an automobile.

FIG. 1 is a block diagram of a known electronic controlled automatic transmission apparatus provided in a body of an automobile. In FIG. 1, reference numeral 1 represents an accelerator pedal, 2 a throttle motor for adjusting a throttle valve 2', 3 an engine, 4 a clutch, 5 a transmission, 6 solenoid valves for driving a clutch actuator 4' and a transmission actuator 5', 7 a drive wheel, 8 a mode selector provided with a transmission lever 8', for manually selecting a drive mode such as drive (D), neutral (N), and reverse (R), 9 a control unit, comprising a microprocessor, for controlling the throttle motor 2, the solenoid valves 6 and producing a hill start aid output (HSA), and 10 an indicator for displaying the present status of the transmission 5.

The control unit 9 receives, at respective input ports, a lever position signal $PS_L$ from the selector 8, an accelerator position signal $PS_A$ from the accelerator pedal 2, i.e., throttle angle signal, an engine speed indication signal $IS_E$ from the output side of the engine 3, a clutch position signal $PS_C$ from the clutch 4, a rotational input-shaft speed indication signal $IS_S$, an automobile speed indication signal $IS_A$, and so on. Note, the above-mentioned input signals $PS_L$, $PS_A$, $PS_C$, $IS_E$, $IS_S$, and so on (not shown) are detected by and output from individual suitable sensors, and that these sensors are widely known in the art.

The control unit 9 receives and processes the individual input signals from these sensors to produce output signals, at the respective output ports, thereby controlling the engine speed through the throttle of the motor 2, engagement or disengagement of the clutch 4 through the clutch actuator 4', and gear changes in the transmission 5 through the transmission actuator 5'. That is, the engagement or disengagement of the clutch 4 is determined by the control unit 9 in response to the engine speed indication signal $IS_E$ and the rotational input-shaft speed indication signal $IS_S$. The gear change in the transmission is controlled in response to the accelerator position signal $PS_A$, indicating the throttle angle, and the engine speed indication signal $IS_E$, with reference to a map (FIG. 2).

Figure 2:
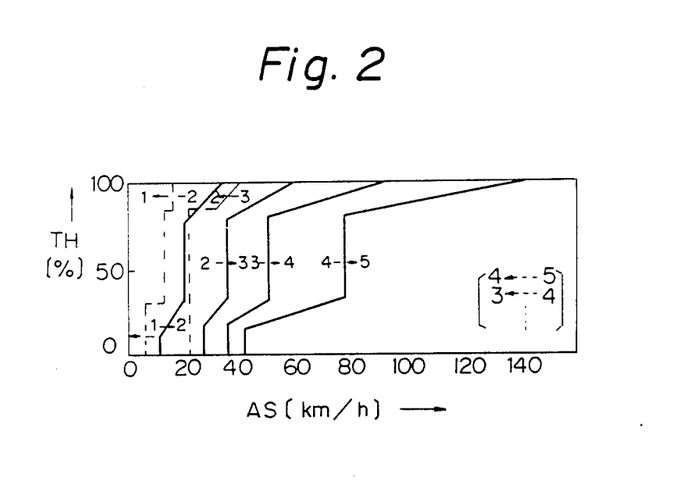
FIG. 2 is a schematic diagram of a map used for determining a suitable gear position.

FIG. 2 is a diagram of a map used for determining a suitable gear position. The map determines the gear position best suitable for the running of the automobile in accordance with the throttle angle TH in % and the automobile speed AS in km/h. A TH of 100% represents a condition wherein the throttle valve is fully open, while a TH of 0% represents a condition wherein the throttle valve is closed. In the map shown in FIG. 2, numerals 1, 2, 3, 4, and 5 denote individual gear positions. The curves indicated by solid lines represent gear change borders during acceleration of the automobile, while the curves indicated by broken lines represent gear change borders during deceleration of the automobile.

As mentioned above, in the electronic controlled automatic transmission apparatus, various input signals such as $PS_L$, $PS_A$, $PS_C$, $IS_E$, $IS_S$, and the like are needed for operation of the running of the automobile. If these input signals could be always guaranteed to be correct, diagnostic searches would not be necessary. However, in actuality, failures may be expected to occur in the related sensors and their peripheral circuits. The present invention is directed to coping with such failures.

Figure 3:
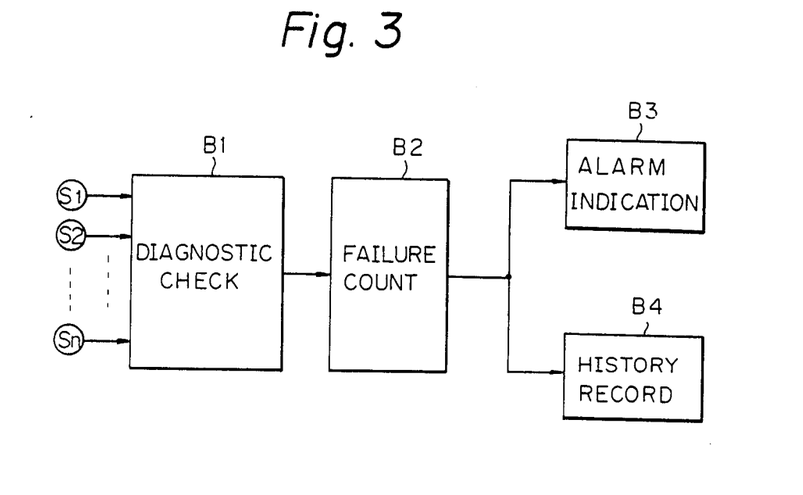
FIG. 3 is a general view of a failure diagnostic processing system according to the present invention.

FIG. 3 is a general view of a failure diagnostic processing system according to the present invention. The system is generally comprised of a first block B1 for achieving a diagnostic check with respect to each of the sensors S1, S2, ..., Sn, a second block B2 for counting pulses upward or downward in accordance with a resultant determination given by the first block B1, a third block B3 for indicating an alarm in accordance with the number of signals counted, and a fourth block B4 for recording a history of failures, such failures to be recorded selectively when failures of the sensors S1, S2, ..., Sn, if any, are judged to be important in view of the number counted in the second block B2.

Figure 4:
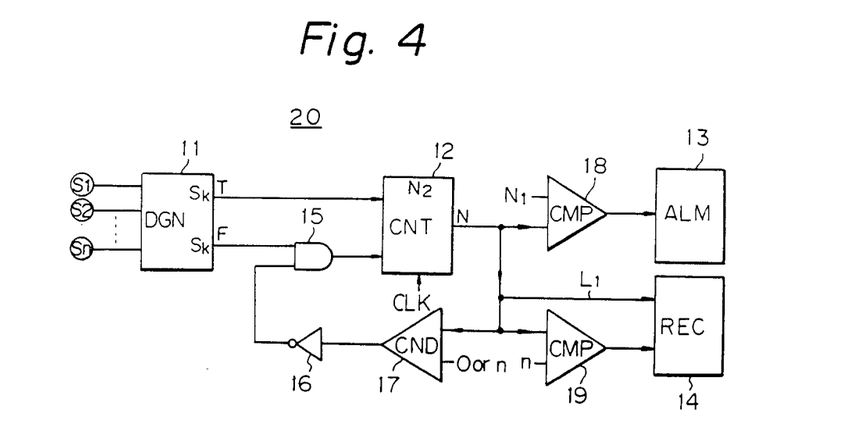
FIG. 4 is a circuit diagram showing details of a failure diagnostic processing system according to an embdiment of the present invention shown in FIG. 3.

FIG. 4 is a circuit diagram, showing details of a failure diagnostic processing system 20 according to the embodiment of the present invention shown in FIG. 3. In FIG. 4, reference numeral 11 represents a self-diagnostic check element (DGN) which is identical to block B1 of FIG. 3, and 12 an error counter (CNT) which corresponds to the second block B2 of FIG. 3. Reference numeral 13 represents an alarm indication part (ALM) which forms, together with a comparator (CMP) 18, block B3 of FIG. 3. Reference numeral 14 represents a history recording element (REC) which forms block B4 of FIG. 3 by cooperating with a comparator (CMP) 19, a coincidence determining element (CND) 17, an inverter 16, and an AND logic gate 15. Note, each sensor, i.e., $S_1$ through $S_n$, is allotted an exclusive system 20 for the purposes of the diagnostic check, except for the DGN element 11. That is, the system 20 is operated with respect to an individual sensor, i.e., the sensor $S_k$ among the sensors $S_1$ through $S_n$ of FIG. 3. Therefore, there are other systems each identical to system 20, except for the common DGN element 11, but these are not shown in FIG. 4, for simplicity. Most preferably, all the functions to be achieved in the system 20 are equivalently attained by processing executed in the control unit 9 of FIG. 1, i.e., the microprocessor.

The DGN element 11 is triggered periodically with a constant time interval. At each periodic diagnostic check, the DGN element 11 determines whether a predetermined failure condition stands for each sensor, including its peripheral circuitry. If the failure condition stands, the DGN element 11 produces a signal T indicating "true", if the condition does not stand it produces a signal F indicating "false". No further detailed explanation of the DGN element 11 itself is given, since the DGN element 11 per se does not feature the essential point of the present invention. Also, the construction of the DGN element 11 should be varied depending on the use of the system 20. For example, with reference to FIG. 1, when the sensor produces the logic "1" signal $PS_C$ indicating that the clutch 4 is engaged, both the sensors must produce the corresponding signals $IS_E$ and $IS_S$, if the sensors have not failed. If, however, the signals $IS_S$ is not generated it will be assumed by the DGN element 11 that the $IS_S$ sensor has failed so long as the clutch 4 is normal.

In FIG. 4, the error counter 12 is incremented if the signal T is generated. Conversely, the counter 12 is decremented if the signal F is generated and, at the same time, the AND logic gate 15 is opened. The element 15 is open if the inverter 16 produces a logic "1". This logic "1" is produced when the coincidence determining element 17 produces a logic "0", indicating that the count number output N from the counter 12 does not coincide with ⌐0⌐ or ⌐n⌐. The number ⌐0⌐ denotes a lower limit or minimum number of the counter 12. The coincidence determining element 17 operates to stop downcounting by the error counter 12, even if the signal F is generated, only where the count number decreases and coincides with a predetermined reference number ⌐n⌐ to hold the count number at a level not lower than this reference number ⌐n⌐, and also, where the count number, which has not exceeded this reference number, decreases and coincides with ⌐0⌐.

The counter 12 stops counting the signal F if the count number reaches a predetermined upper limit number $N_2$; this count stop is achieved by the counter 12 itself. Thus, in general, the error counter 12 is operative to count signals T and F upward and downward, respectively.

The number ⌐n⌐ also denotes a reference for starting a record of failures as a failure history record. That is, when the comparator 19, as a record controlling part, determines that the number N exceeds the reference number ⌐n⌐, the output from the comparator 19 activates the history recording element 14 to record each number N via a line $L_1$. On the other hand, if the output N from the counter 12 does not coincide with any one of the numbers ⌐0⌐ through ⌐n−1⌐, the coincidence determining element 17 produces a logic "1", and therefore, the AND logic gate 15 is closed, via the inverter 16, so that the counter 12 stops the count down. Thus the block B4 of FIG. 3, i.e., elements 14, 15, 16, 17, and 19 in FIG. 4, is operative to record the failure number N if the number N exceeds the reference number ⌐n⌐.

The comparator 18 operates to determine whether the count number N from the counter 12 exceeds a number $N_1$. The number $N_1$ denotes a reference for activating the alarm indication element 13. If $N_1$ is exceeded, the alarm indication element 13 starts restoring the failure concerned immediately, since such a failure is serious. For example, the alarm indication element 13 starts flashing an alarm lamp (not shown) to inform the operator or driver that the related apparatus to be supervised by the system 20 must be stopped. The alarm indication part 13 may also produce and transfer a predetermined safeguard signal to a predetermined element in the microprocessor. The restoration method for such serious failures is not a feature of the present invention, and no further explanation of this is given herein. Thus, in general, the elements 13 and 18 (corresponding to the block B3 of FIG. 3) operate to provide the alarm indication only for a serious failure.

As previously mentioned, all the functions performed by each element of the failure diagnostic processing preferably can be attained with the use of the microprocessor, corresponding to the control unit 9 of FIG. 1. Of these functions, the function to be attained by the error counter 12 of FIG. 4 is more important than the other functions, for the present invention, as will be specifically clarified with reference to FIG. 6 hereinafter.

Figure 5:
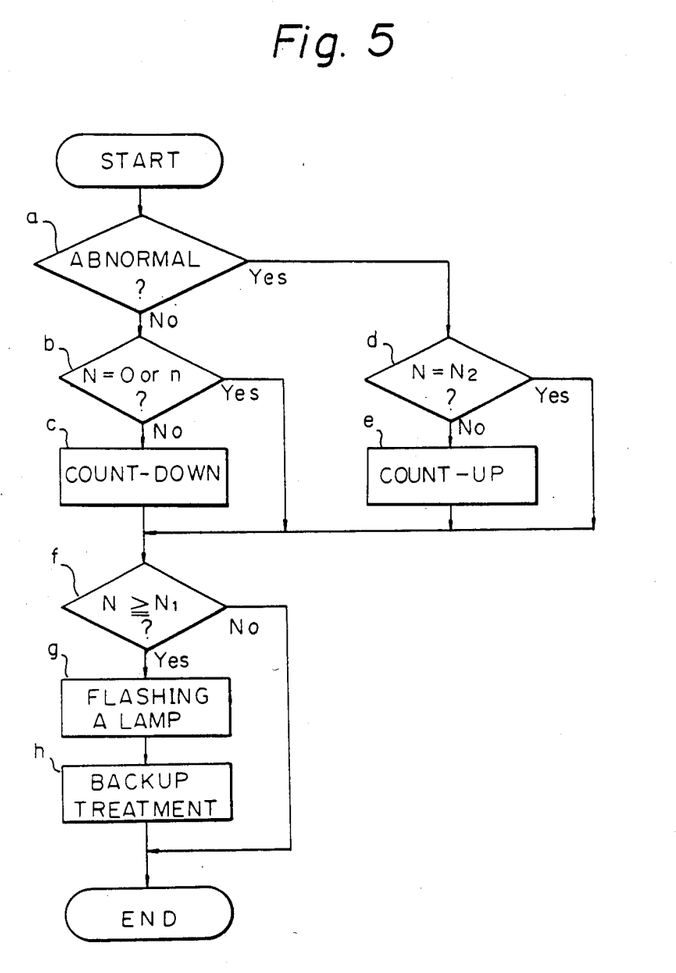
FIG. 5 is a flow chart of the procedure performed by the error counter shown in FIG. 4.

FIG. 5 is a flow chart of the procedure performed in the error counter 12 of FIG. 4. Every time the DGN element 11 of FIG. 4 produces the signal T or F, the flow shown in FIG. 5 starts, as follows. In step a, whether or not a failure has occurred is determined, i.e., whether or not the abnormal condition stands. If "Yes", the flow continues to step d, while if "No", the flow goes to step b. In step b, whether or not the count number N coincides with 0 or n is determined. If "Yes", the flow continues to step f, while if "No", the flow goes to step c. In step C, the countdown operation by the signal F is carried out and the flow then goes to step f.

Returning to step a, if the answer is "Yes", the flow goes to step d. In step d, whether or not the count number N has reached the predetermined upper limit number $N_2$ is determined. If "Yes", the flow goes to step f, while if "No" the flow continues to step e. In step e, the count up operation by the signal T is carried out, and the flow then goes to step f.

In step f, whether or not the count number N reaches and exceeds the reference number $N_1$ for activating the alarm indication element 13 is determined. If "Yes", the flow continues to step g, while if "No" the concerned procedure is completed. In step g, an alarm indication device, such as an alarm lamp, is rendered to be continuously flashing. This is then followed by step h. In step h, a suitable backup treatment is performed for restoring the failure concerned, and the flow of the procedure then reaches its END. As previously mentioned, the steps g and h follow only when the system 20 discriminates the occurrence of a serious failure. In this case, the manner in which steps g and h are dealt with is outside the subject of the present invention. This can be carried out in various ways.

The thus operated system 20 can be applied to the supervision of abnormalities in various kinds of computer controlled apparatuses, such as the electronic controlled automatic transmission apparatus shown in FIG. 1. Taking this automatic transmission apparatus as an example, the error counter 12 maintains its count number N at all times except when the battery of the automobile is removed or the power source plug thereof is removed. If such an exception occurs, the counter 12 is initialized to $\lceil 0 \rfloor$. Further, the counter 12 deals with 4 bit data and, therefore, has a number counting capacity in a range between $\lceil 0 \rfloor$ and $\lceil 15 \rfloor$. The number $\lceil 15 \rfloor$ corresponds to the aforesaid upper limit number $N_2$, i.e., $N_2 = 15$ in this case, as shown in FIG. 6.

Figure 6:
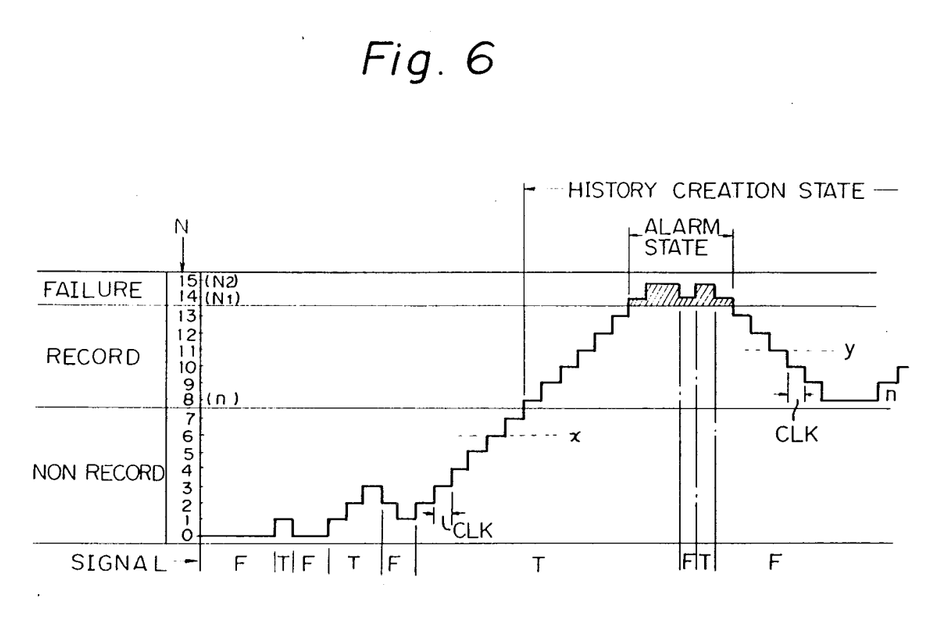
FIG. 6 is an explanatory graph used for showing an arbitrary example of a procedure performed in a major part of the system shown in FIG. 4.

FIG. 6 is an explanatory graph showing an arbitrary example of the procedure performed in a part of the system 20 shown in FIG. 4. In the graph, the ordinate denotes the count number N from the error counter 12 and the abscissa denotes the signal T or F from the DGN element 11. Every time the signal T is produced, i.e., the predetermined failure condition stands, the count number N is increased once for every clock pulse. In FIG. 4, the characters CLK represent a clock signal, while in FIG. 6, the pulse width thereof is represented by CLK. If the count number N is lower than the reference number n for starting the record of failure, i.e., $n = 8$ in this case, the count number N is disregarded and is not recorded in the history recording element 14 (FIG. 4). Usually, a pseudo failure signal F (which results in a T signal from the DGN element 11) occurs at random intervals due to various factors, such as external noise, vibration, mechanical shock, and so on. These factors can be called soft failures. Soft failures usually do not occur continually, but irregularly, and therefore, the count number N, responding thereto, seldom increases linearly. On the other hand, a real signal F due to a hard error, such as a short circuit, open circuit, and so on, usually occurs continually. Accordingly, the count number N usually increases linearly. An intermediate signal F, which is situated between the pseudo signal F and the real signal F, will probably mature into the real signal F. Therefore, it is important to watch such an intermediate signal F after it has occurred. This watch can be performed by recording past failures in the failure history recording element 14 (FIG. 4). Thus, in FIG. 6, a count number N lower than $\lceil 8 \rfloor$ is not recorded (NONRECORD), but a count number N equal to or higher than $\lceil 8 \rfloor$ is recorded (RECORD). To create the failure history record, once the number N reaches $\lceil 8 \rfloor$, the number N is compulsorily held to be not lower than $\lceil 8 \rfloor$ (n). This corresponds to a "HISTORY CREATION STATE" in FIG. 6. During states other than the "HISTORY CREATION STATE", the count number N is reduced in response to the signal F.

If the count number N is equal to or higher than the reference number $N_1$ for activating the alarm indication element 13 (FIG. 4), i.e., $N_1 = 14$ in this case, the comparator 18 (FIG. 4) determines that a certain serious failure has occurred, i.e., a hard error, and immediately activates the alarm indication element 13 to continually flash the alarm lamp, during the "ALARM STATE" of FIG. 6.

When the constant periodic diagnostic check by the DGN element 11 (FIG. 4) is set to be equal to the frequency of the clock signal CLK, a maximum of fourteen clocks pulses are needed to detect a serious failure, as exemplified in FIG. 6. However, once the count number N is brought into the history creation state, the number N will be increased not from $\lceil 0 \rfloor$ but from $\lceil 8 \rfloor$ even in the worst case, with respect to the regeneration of the same failure, because the number N, which is now higher than 8 in any event, is stored in the recording element 14 (FIG. 4). This means that the system 20 can determine such recurrences of the same failure in a time as short as within seven time periodic diagnostic checks, at most. Further, when the count number N is brought into the alarm state, i.e., $N = \lceil 14 \rfloor$ or $\lceil 15 \rfloor$, the alarm state can be speedily ended within two time periodic diagnostic checks, if the signal F is produced continuously, due to, for example, a self-restoring ability, if any.

The following table shows the relationship, as an example of the diagnostic check period CP in seconds S (as in the following), the maximum failure detection time DT, and the maximum restoration time RT. The time DT is classified into two cases; that is, case C1 where no history record has been created, and case C2 where the history record has been created.

TABLE

| CP s | DT s | | RT s |
| --- | --- | --- | --- |
| | C1 | C2 | |
| 0.1 | 1.4 | 0.7 | 0.2 |
| 0.2 | 2.8 | 1.4 | 0.4 |
| 0.4 | 5.6 | 2.8 | 0.8 |
| 0.8 | 11.2 | 5.6 | 1.6 |
| 1.6 | 22.4 | 11.2 | 3.2 |
| 3.2 | 44.8 | 22.4 | 6.4 |
| 6.4 | 89.6 | 44.8 | 12.8 |

Figure 7:
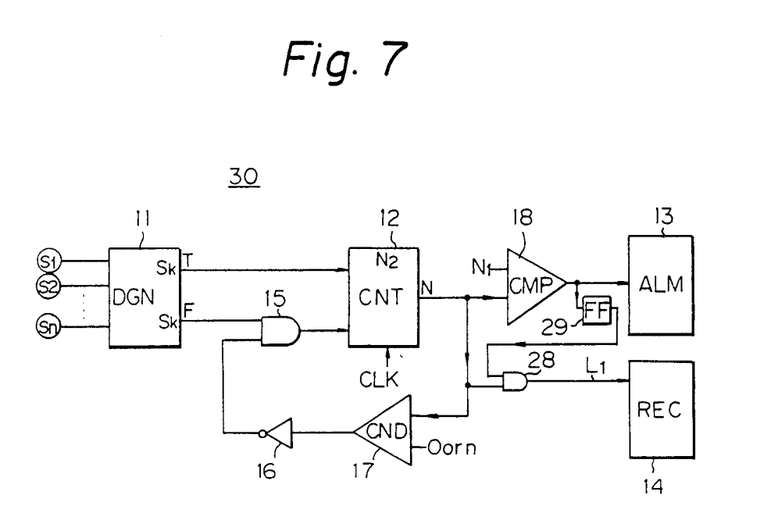
FIG. 7 illustrates a modification of the failure diagnostic processing system according to the present invention.

FIG. 7 illustrates a modification of the failure diagnostic processing system according to the present invention. The modified system 30 of FIG. 7 is different from that of FIG. 4 in that a flip-flop (FF) 29 and an AND logic gate 28 are employed, instead of the comparator 19 of FIG. 4. In the thus modified system 30, the failure history recording element 14 is not activated until the count number N is once brought into the alarm state, i.e., N=14 or 15. Once the number N reaches 14, at least, the flip-flop 29 enables the failure history recording element 14 to record. Accordingly, the element 14 records information concerning more serious failures than those recorded by the system 20.

Returning to FIG. 4, it is possible to replace the reference number n for the coincidence determining element 17 with number x and replace the number n for the comparator 19 with y, as shown by x and y in FIG. 6. This means that a relatively wide range of the number N is taken into consideration for monitoring, however, the numbers N to be recorded are of a relatively small range. Also the recorded numbers N indicate relatively serious information regarding failures.

Further, although the periodic diagnostic check is described as being performed with the interval of the clock pulse CLK, it may also be possible to perform the same with an interval of k.CLK, where k is a positive integer larger than 2. For example, if the system 20 or 30, except for the DGN element 11, is allotted to a sensor for detecting an engine temperature, it is not necessary to perform the diagnostic check so frequently, because any change in the engine temperature is usually very slow. Note, the systems 20 or 30 must begin operating only after a short time has passed following power on, when initially driven by the power, to wait till the output voltage is stabilized.

As previously mentioned in detail, a highly reliable and precise diagnostic check can be performed by the present invention in a computer controlled apparatus.

What is claimed:

1. A failure diagnostic processing system for an apparatus supervised by sensors which detect individual conditions of the apparatus, said system comprising:
    checking means, operatively connected to the sensors, for achieving diagnostic checks with respect to the sensors to produce first and second diagnostic signals regarding each of the sensors, the first and second diagnostic signals indicating that a failure condition exists and does not exist, respectively;
    counting means, operatively connected to said checking means, for generating a count number by incrementing and decrementing selectively in response to the first and second diagnostic signals, respectively;
    alarm means, operatively connected to said counting means, for providing an alarm indication in accordance with the count number of said counting means; and
    recording means, operatively connected to said counting means, for creating a history of failures by recording the count number of said counting means after the count number exceeds a first predetermined reference number.

2. A system as set forth in claim 1, further comprising a clock, operatively connected to said checking means and said counting means, and
    wherein said checking means performs the diagnostic checks periodically with a predetermined constant interval in synchronism with said clock of said system.

3. A system as set forth in claim 2, wherein the predetermined constant interval is individually predetermined for each of the sensors.

4. A system as set forth in claim 2, wherein said counting means comprises an error counter in said system, counting upward every time the predetermined constant interval passes when the first diagnostic signal is being produced and, otherwise, counting downward every time the predetermined constant interval passes when the second diagnostic signal is being produced.

5. A system as set forth in claim 4, wherein said error counter generates the count number within a range between a lower limit of 0 and an upper limit number.

6. A system as set forth in claim 5, wherein said alarm means comprises:
    a first comparator, operatively connected to said error counter, for comparing the count number from said error counter to a second predetermined reference number and producing a signal; and
    an alarm indication element, operatively connected to said first comparator, activated by the signal produced by said first comparator when the count number is higher than the second predetermined reference number.

7. A system as set forth in claim 6, wherein said alarm indication element comprises an alarm lamp, operatively connected to said first comparator, for flashing an alarm.

8. A failure diagnostic processing system for an apparatus supervised by sensors which detect individual conditions of the apparatus, said system comprising:
    a clock;
    checking means, operatively connected to the sensors and said clock, for periodically performing diagnostic checks with respect to the sensors at a predetermined constant interval in synchronism with said clock to produce first and second diagnostic signals regarding each of the sensors, the first and second diagnostic signals indicating that a failure condition exists and does not exist, respectively;
    counting means, operatively connected to said checking means and said clock, for generating a count number by incrementing and decrementing selectively in response to the first and second diagnostic signals, respectively, said counting means comprising an error counter for counting upward every time the predetermined constant interval passes when the first diagnostic signal is being produced and counting downward every time the predetermined constant interval passes when the second diagnostic signal is being produced and for generating the count number within a range between a lower limit of zero and an upper limit number;

alarm means, operatively connected to said counting means, for providing an alarm indication in accordance with the count number of said counting means, said alarm means comprising:

a first comparator, operatively connected to said error counter, for comparing the count number from said error counter to a first predetermined reference number and producing a signal; and an alarm indication element, operatively connected to said first comparator, activated by the signal produced by said first comparator when the count number is higher than the first predetermined reference number; and recording means, operatively connected to said counting means, for creating a history of failures by recording the count number of said counting means after the count number exceeds a second predetermined reference number, said recording means comprising:

a history recording element, operatively connected to said error counter, for recording the count number from said error counter;

a recording controlling element, operatively connected to said error counter and said history recording element, for producing an output for activating said history recording element; and a coincidence determined element, operatively connected to said error counter, for stopping the decrementing of said error counter, even if the second diagnostic signal is being produced, when the count number decreases and coincides with a third predetermined reference number, thus holding the count number to be at least as large as the third predetermined reference number and also for stopping the decrementing of the count number, when the count number has not exceeded the third predetermined reference number, once the count number coincides with 0.

9. A system as set forth in claim 8, wherein said record controlling element comprises a second comparator, operatively connected to said error counter and said history recording element, for producing an output for activating said history recording element when the count number exceeds the second predetermined reference number.

10. A system as set forth in claim 9, wherein the second predetermined reference number is set to be higher than the third predetermined reference number.

11. A system as set forth in claim 8, wherein said record controlling element comprises:

a flip-flop, operatively connected to said first comparator, for producing a logic value "1" once said first comparator produces the signal for activating said alarm indication element; and an AND logic gate, operatively connected to said error counter, said flip-flop and said history recording element, for allowing passage of the count number therethrough to said history recording element when said flip-flop produces the logic value "1".

12. A failure diagnostic method using data sensed by sensors, comprising the steps of:

(a) checking the sensors periodically to detect whether a failure condition exists;

(b) counting in dependence upon said checking by incrementing a count number if the failure condition exists and decrementing the count number if the failure condition does not exist, comprising the substeps of:

(bi) stopping said incrementing when the count number coincides with a maximum count number;

(bii) stopping said decrementing of the count number when the count number coincides with zero and the count number has remained less than a recording start number; and (biii) stopping said decrementing of the count number when the count number coincides with the recording start number after the count number has been incremented to a value at least as large as the recording start number;

(c) indicating an alarm in dependence upon the count number; and (d) recording the count number when the count number is at least as large as the recording start number.

13. A failure diagnostic processing system for an apparatus monitored by sensors which detect individual conditions of the apparatus, said system comprising:

clock means for supplying a clock signal;

checking means, operatively connected to the sensors and said clock means, for periodically performing diagnostic checks with respect to the sensors at a predetermined constant interval in synchronism with the clock signal to produce first and second diagnostic signals regarding each of the sensors, the first and second diagnostic signals indicating that a failure condition exists and does not exist, respectively;

counting means, operatively connected to said checking means and said clock means, for generating a count number by incrementing and decrementing selectively in response to the first and second diagnostic signals, respectively, said counting means comprising an error counter for counting upward every time the predetermined constant interval passes when the first diagnostic signal is being produced and counting downward every time the predetermined constant interval passes when the second diagnostic signal is being produced and for generating the count number within a range between a lower limit number and an upper limit number;

alarm means, operatively connected to said counting means, for providing an alarm indication in accordance with the count number of said counting means, said alarm means comprising:

a first comparator, operatively connected to said error counter, for comparing the count number from said error counter to a first predetermined reference number and producing a signal; and an alarm indication element, operatively connected to said first comparator, activated by the signal produced by said first comparator when the count number is higher than the first predetermined reference number; and coincidence determining means, operatively connected to said error counter, for stopping the decrementing of said error counter, even if the second diagnostic signal is being produced, when the count number decreases and coincides with a third predetermined reference number, thus holding the count number to be at least as large as the third predetermined reference number and also for stopping the decrementing of the count number, when the count number has not exceeded the third predetermined reference number, once the count number coincides with the lower limit number.

* * * * *